(12) United States Patent
Cady

(10) Patent No.: US 10,220,337 B2
(45) Date of Patent: Mar. 5, 2019

(54) METHOD OF SECURING A SCREEN TO A BASKET OF A VIBRATORY SEPARATOR USING A MAGNETIC WEDGE

(71) Applicant: M-I L.L.C., Houston, TX (US)

(72) Inventor: Eric Cady, Florence, KY (US)

(73) Assignee: M-I L.L.C., Houston, TX (US)

( * ) Notice: Subject to any disclaimer, the term of this patent is extended or adjusted under 35 U.S.C. 154(b) by 592 days.

(21) Appl. No.: 14/417,493

(22) PCT Filed: Jul. 25, 2013

(86) PCT No.: PCT/US2013/052038
§ 371 (c)(1),
(2) Date: Jan. 26, 2015

(87) PCT Pub. No.: WO2014/018746
PCT Pub. Date: Jan. 30, 2014

(65) Prior Publication Data
US 2015/0251113 A1   Sep. 10, 2015

Related U.S. Application Data

(60) Provisional application No. 61/675,619, filed on Jul. 25, 2012.

(51) Int. Cl.
*B01D 33/80* (2006.01)
*F16B 2/00* (2006.01)
*E21B 21/06* (2006.01)
*B01D 33/03* (2006.01)
*B07B 1/28* (2006.01)
*B07B 1/46* (2006.01)
*B01D 33/00* (2006.01)

(52) U.S. Cl.
CPC ....... *B01D 33/803* (2013.01); *B01D 33/0093* (2013.01); *B01D 33/0376* (2013.01); *B07B 1/28* (2013.01); *B07B 1/46* (2013.01); *E21B 21/065* (2013.01); *F16B 2/00* (2013.01); *Y10T 29/49826* (2015.01); *Y10T 29/49959* (2015.01)

(58) Field of Classification Search
CPC .......... B07B 1/28; B07B 1/46; B01D 33/093; B01D 33/803; B01D 33/0376; B01D 33/0093; E21B 21/065; F16B 2/00; Y10T 29/49826; Y10T 29/49959
USPC ......................................... 209/399, 403, 405
See application file for complete search history.

(56) References Cited

U.S. PATENT DOCUMENTS

| | | | | |
|---|---|---|---|---|
| 3,976,902 A | * | 8/1976 | Simmonds | H02K 15/0018 264/108 |
| 5,811,003 A | * | 9/1998 | Young | B01D 33/0346 210/388 |
| 5,971,175 A | * | 10/1999 | Bustos | A47F 5/13 211/187 |

(Continued)

OTHER PUBLICATIONS

International Search Report and Written Opinion for corresponding PCT Application Serial No. PCT/US2013/052038 dated Nov. 18, 2013, 9 pages.

*Primary Examiner* — Matthew O Savage
(74) *Attorney, Agent, or Firm* — Paula B. Whitten

(57) ABSTRACT

An apparatus including a basket of a vibratory separator configured to impart motion to a screen, a wedge angle coupled to the basket, and a wedge configured to engage with the wedge angle to secure the screen within the basket, in which a portion of the wedge is magnetic.

3 Claims, 2 Drawing Sheets

(56) References Cited

U.S. PATENT DOCUMENTS

| | | | |
|---|---|---|---|
| 6,119,868 A * | 9/2000 | Hiltl | B07B 1/46 |
| | | | 209/399 |
| 6,135,516 A * | 10/2000 | Gasperino | B62B 1/12 |
| | | | 224/277 |
| 2002/0153288 A1 | 10/2002 | Suter et al. | |
| 2008/0149538 A1 | 6/2008 | Burkhard et al. | |
| 2008/0149539 A1 | 6/2008 | Burkard | |
| 2008/0308501 A1 | 12/2008 | Irvine | |
| 2011/0240531 A1 | 10/2011 | Timmerman et al. | |

* cited by examiner

METHOD OF SECURING A SCREEN TO A BASKET OF A VIBRATORY SEPARATOR USING A MAGNETIC WEDGE

BACKGROUND

Oilfield drilling fluid, often called "mud," serves multiple purposes in the industry. Among its many functions, the drilling mud acts as a lubricant to cool rotary drill bits and facilitate faster cutting rates. The mud may be mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures thereby preventing fluids from blowing out if pressurized deposits in the formation are breached. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Drilling mud weight may be reported in "pounds," short for pounds per gallon. Increasing the amount of weighting agent solute dissolved in the mud base may create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies reclaim the returned drilling mud and recycle it for continued use.

Drilling mud is also used to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and re-pumped down through nozzles of the drill bit, the cutting particulates need to be removed.

Apparatuses in use today to remove cuttings and other solid particulates from drilling fluid are commonly referred to in the industry as shale shakers or vibratory separators. A vibratory separator is a vibrating sieve-like table or screening deck upon which returning solids laden drilling fluid is deposited, and through which drilling fluid, that has been separated from much of the solids, emerges from the vibratory separator. The vibratory separator may be an angled table with a perforated filter screen bottom. Returning drilling fluid is deposited at a feed end of the vibratory separator. As the drilling fluid travels down length of the vibrating table, the fluid falls through the perforations to a reservoir below leaving the solid particulate material behind.

Filter screens may include a perforated plate base upon which a wire mesh, and/or other perforated filter overlay, is positioned. The perforated plate base generally provides structural support and allows the passage of fluids therethrough. A vibratory separator may have multiple screens which are held in place by two wedges, one on each side of each screen.

DETAILED DESCRIPTION

Figure 1:
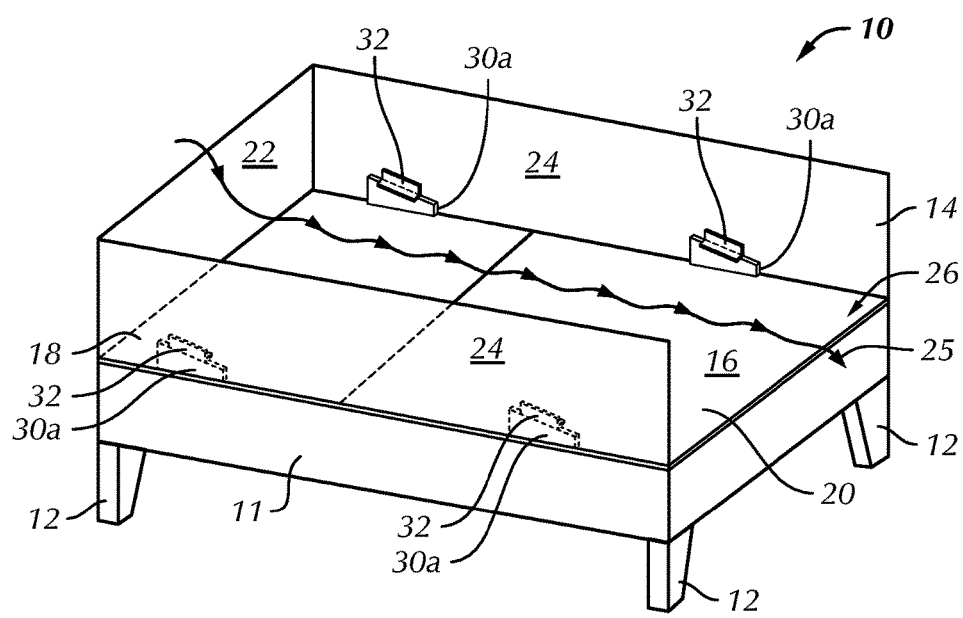
FIG. 1 is a perspective view of a vibratory separator having a plurality of wedges according to embodiments disclosed herein.

The following is directed to various exemplary embodiments of the disclosure. According to one or more embodiments, this disclosure may be directed to a wedge used in a vibratory shaker, in which at least a portion of the wedge is magnetic. During transport of vibratory separators between operations, tools, such as straps or harnesses, may be used to secure the wedge and to prevent its misplacement during transport. The use of wedges in which at least a portion of each of the wedges is magnetic may remove the need for tools to prevent the misplacement of the wedges during transport, as each of the wedges may be magnetically engaged with at least a portion of a structure of the vibratory separator, in which at least a portion of the structure of the vibratory separator is formed from a ferromagnetic material. The embodiments disclosed should not be interpreted, or otherwise used, as limiting the scope of the disclosure, including the claims. In addition, those having ordinary skill in the art will appreciate that the following description has broad application, and the discussion of any embodiment is not intended to suggest that the scope of the disclosure, including the claims, is limited to that embodiment.

Certain terms are used throughout the following description and claims to refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first component is coupled to a second component, that connection may be through a direct connection, or through an indirect connection via other components, devices, and connections.

According to one aspect of the disclosure, there is provided a vibratory separator apparatus, the vibratory separator apparatus including a frame, a basket, a wedge angle coupled to the basket, and a wedge configured to engage with the wedge angle to secure a screen within the basket, in which a portion of the wedge may be magnetic.

According to one or more embodiments, the vibratory separator apparatus may include a basket of a vibratory separator configured to impart motion to a screen, a wedge angle coupled to the basket, and a wedge configured to engage with the wedge angle to secure the screen within the basket, in which a portion of the wedge is magnetic.

In one or more embodiments, a portion of each of the frame of the vibratory separator and the basket may be formed from a ferromagnetic material such as iron or mild steel. Further, the vibratory separator may include a skid, in which a portion of the skid may also be formed from a ferromagnetic material. In one or more embodiments, the magnetic portion may include a magnetic material disposed in or on the wedge. In one or more embodiments, the magnetic portion of the wedge may include a magnetic insert coupled to a portion of the wedge. Further, in one or more embodiments, the magnetic insert of the wedge may include a protrusion, in which the protrusion is configured to engage with a portion of the wedge and may be configured to secure the magnetic insert within the wedge. In one or more embodiments, the magnetic insert and the magnetic material may be formed from a high-temperature magnet, and may be formed from one of a ceramic magnet and a rare earth magnet. Furthermore, in one or more embodiments, the magnetic portion of the wedge may include a magnetic insert that is threadingly engaged with a portion of the wedge. In one or more embodiments, the pull force of the magnetic portion of the wedge may be between five pounds and 25 pounds.

Referring to FIG. 1, a vibratory separator 10 according to embodiments disclosed herein is shown. As shown, the vibratory separator 10 includes a skid 11, a lower frame 12, and a basket 14. The vibratory separator apparatus 10 may have a variety of shapes and configurations, but generally may be intended to receive solids-laden mud from a distribution box (not shown) into the basket 14. In one or more embodiments, the basket 14 may be vibrated by a motor (not shown) relative to the frame 12. Further, in one or more embodiments, the basket 14 may include an upstream end 18, a downstream end 20, a back wall 22 at the upstream end 18, and two side walls 24. In one or more embodiments, the downstream end 20 of the basket 14 may be open and may include an open end 26.

During operation, drilling mud including suspended solids may be poured into the basket 14 over the back wall 22 and onto a screen 16. Once on the screen 16, the solids-laden mud may be vibrated toward the downstream end 20 of the basket 14, which may cause the mud to pass through the screen 16 into a collection box (not shown), and out of the vibratory separator 10 for further processing. The flow path of the solids-laden mud is indicated by arrows 25. The solids may continue to be conveyed downstream on the screen 16 toward the open end 26 of the basket 14 where the solids are either dropped onto another screen (not shown) for further separation or discarded.

The screen 16 may be mounted in the basket 14 with one or more wedges 30. In one or more embodiments, the wedge 30 may be hammered into place under a wedge angle 32 that may be welded to the inside of the basket 14 at an angle corresponding to the angle of the wedge 30. The wedge angles 32 may be brackets, for example, L-brackets or other structure that allows the wedge 30 to slidingly engage and wedge 30 between the wedge angle 32 and the top surface of the screen (not shown). In this manner, the screens 16 may be installed by placing a pre-tensioned screen 16 onto support rails (not shown) in the basket 14. Once in place, at least one of the wedges 30 may be placed on top of the pre-tensioned screen 16 under one of the wedge angles 32 and then hammered into engagement with the wedge angle 32 to apply a downward force on the screen 16. Accordingly, contact between the screen 16 and the support rail (not shown) in the basket 14 may be maintained.

In one or more embodiments, one or more portions of the structure of the vibratory separator 10 may be formed from a substantially rigid ferromagnetic material. In one or more embodiments, the structure of the vibratory separator 10 may include, at least, the frame 12, the basket 14, and/or the skid 11 and may be formed from a substantially rigid ferromagnetic material. For example, in one or more embodiments, at least one of the frame 12, the basket 14, the skid 11, and/or any other portion of the vibratory separator 10 may be formed from a substantially rigid ferromagnetic material such as iron or mild steel.

As will be discussed below, at least a portion of the wedge 30 may be magnetic.

For example, in one or more embodiments, the wedge 30 may include at least one magnet (not shown) coupled thereto or formed therein. For example, in one or more embodiments, the wedge 30 may be cast or molded around at least one magnet such that the at last one magnet is completely surrounded by the wedge material, in which a surface of the magnet is not exposed by the wedge 30. Further, in one or more embodiments, at least a portion of the wedge 30 may be formed from a magnetic material. Furthermore, in one or more embodiments, a magnetic material may be distributed throughout the material(s) from which the wedge 30 is formed. In one or more embodiments the wedge 30 may be formed purely from a magnetic material. In one or more embodiments, the wedge may be angled toward the downstream end 20 of the basket 14. Alternatively, in one or more embodiments, the wedge may be angled toward the upstream end 18 of the basket 14. Moreover, in one or more embodiments, multiple wedges may be used, and the multiple wedges may be oriented either toward the upstream end 18, the downstream end 20, or a combination of both.

As a result, the wedge 30 may be magnetically attracted to the structure of the vibratory separator 10, which may be formed from a ferromagnetic material. As such, mating magnets may not need to be disposed or coupled to the structure of the vibratory separator 10, as the magnetic material of the wedge 30 may be magnetically attracted to the ferromagnetic material of the structure of the vibratory separator 10.

In one or more embodiments, the wedge 30 may be secured to at least one of the frame 12, the basket 14, the skid 11, and/or any other portion of the vibratory separator 10 by the magnetic force between the magnetic material of the wedge 30 and the ferromagnetic material in the structure of the vibratory separator 10. For example, during transport of the vibratory separator 10 between operations, the wedge 30 may be disengaged from the wedge angle 32 and may be magnetically engaged with a portion of the structure of the vibratory separator, such as at least one of the frame 12, the basket 14, the skid 11, and/or any other portion of the vibratory separator 10, formed from a ferromagnetic material, to avoid misplacement or loss of the wedge 30 during transport. The magnetic engagement between the wedge 30 and the structure of the vibratory separator 10 may remove the need for tools, such as straps or harnesses, to avoid misplacement of the wedge 30 during transport. Instead of using tools to secure the wedge 30 to the vibratory separator 10 during transport, the wedge 30 may be magnetically engaged with the structure of the vibratory separator 10.

Further, in one or more embodiments, the magnetic engagement between wedge 30 and the basket 14 may help prevent the wedge 30 from becoming disengaged during operation. For example, in one or more embodiments, the magnetic engagement between the wedge 30 and the basket 14 may help hold the wedge 30 in place during operation and may provide enhanced reinforcement for the engagement between the wedge 30 and the wedge angle 32 to prevent the wedge 30 from becoming disengaged from the wedge angle 32 during operation.

Alternatively, in one or more embodiments, the wedge 30 may be formed substantially from a urethane such as polyurethane. However, those having ordinary skill in the art will appreciate that the wedge 30 may be formed from any material, magnetic or non-magnetic, known in the art and are not limited to being formed from polyurethane. In one or more embodiments, a ferromagnetic material, such as steel, may be coupled to or disposed within the polyurethane wedge. As such, in one or more embodiments, magnetic inserts may be coupled to the structure of the vibratory separator 10 such that the magnetic force between the magnetic materials coupled to the structure of the vibratory separator 10 may be strong enough the magnetically engage with the wedge 30 through a polyurethane layer (not shown). In other words, the wedge that may be formed from a non-magnetic material, such as polyurethane, that has a ferromagnetic material disposed therein may still be magnetically engaged with the structure of the vibratory separator 10 if sufficient magnetic materials, e.g., magnetic materials with sufficient pull force to engage with the wedge 30 through the polyurethane layer, are coupled to the structure of the vibratory separator 10.

According to another aspect of the disclosure, there is provided a wedging apparatus for a vibratory separator, the wedging apparatus including a body configured to secure a screen to the vibratory separator, the body including a bottom surface, a top surface opposite the bottom surface, and an end surface joining the bottom surface and the top surface, in which each of the bottom surface and the top surface are configured to be a wedging surface, and in which a portion of the body may be magnetic.

According to one or more embodiments, the wedging apparatus for a vibratory separator may include a body configured to secure a screen to a vibratory separator, the body having a thickness defined between a bottom surface and a top surface, and an end surface joining the bottom surface and the top surface, in which each of the bottom surface and the top surface are configured to be engageable with at least one of a screen and a wedge angle, and further wherein a portion of the body is magnetic.

In one or more embodiments, the magnetic portion may include a magnetic material disposed in or on the body, such as a magnetic material powder or a magnetic plating covering a portion of an outer surface of the body. Further, in one or more embodiments, the body may also include a magnetic insert coupled to a portion of the body. In one or more embodiments, the magnetic insert may include a protrusion formed thereon, in which the protrusion is configured to engage with a portion of the body. Further, in one or more embodiments, the magnetic insert may be threadingly engaged with a portion of the body. Furthermore, in one or more embodiments, the magnetic insert and the magnetic material may be a high-temperature magnet, and may be one of a ceramic magnet and a rare earth magnet. In one or more embodiments, the pull force of the magnetic portion of the body may be between five pounds and 25 pounds.

Figure 2A:
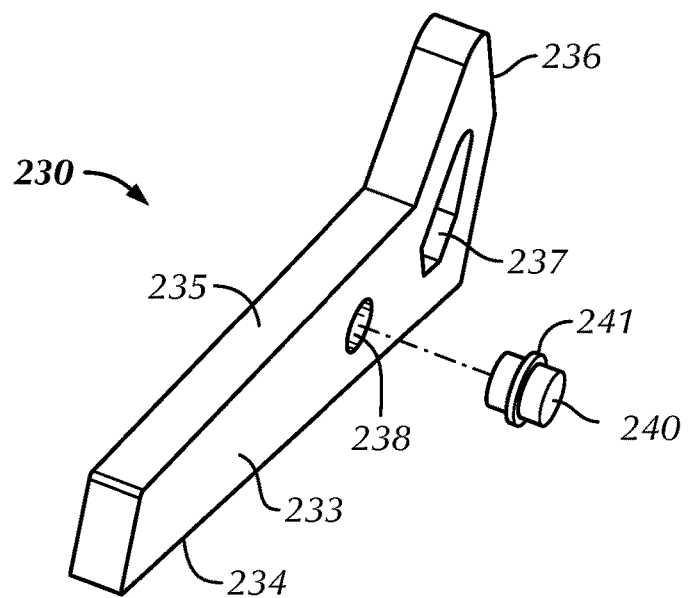
FIG. 2A is a perspective view of a wedge and a magnetic insert for a vibratory separator according to embodiments disclosed herein.
Figure 2B:
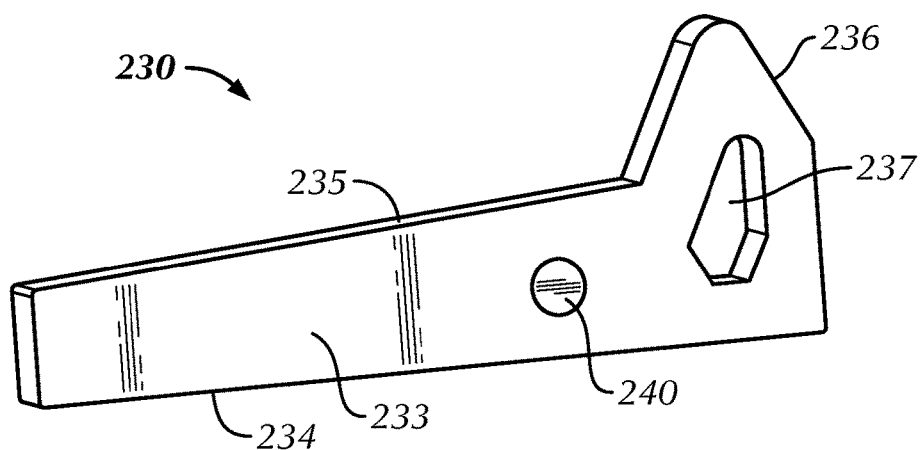
FIG. 2B is a perspective view of the wedge of FIG. 2A having the magnetic insert disposed therein according to embodiments disclosed herein.

Referring to FIGS. 2A and 2B, FIG. 2A shows a perspective view of a wedge 230 and a magnetic insert 240 for a vibratory separator (not shown) in accordance with embodiments disclosed herein, and FIG. 2B shows a perspective view of the wedge 230 having the magnetic insert 240 disposed in an aperture, i.e., an aperture 238, formed in the wedge 230 in accordance with embodiments disclosed herein.

As shown in FIG. 2A, the wedge 230 includes a body 233. In one or more embodiments, the body 233 may include an outer polygonal surface, and the body 233 may be configured to engage with a wedge angle (not shown), e.g., the wedge angle 32 of FIG. 1. For example, in one or more embodiments, the body 233 of the wedge 230 may include a bottom surface 234, a top surface 235, and an end surface 236 joining the bottom surface 234 and the top surface 235. One or both of the bottom surface 234 and the top surface 235 may be a wedging surface and may be angled to help wedge or engage the wedge 230 between a wedge angle (not shown) and a screen (not shown).

Further, as shown in FIGS. 2A and 2B, the body 233 of the wedge 230 may have an aperture 237 formed therethrough extending fully or partially from a first side surface to a second side surface in proximity to the end surface 236. The aperture 237 may form a handle for a user to grasp and handle the wedge 230 in proximity to the end surface 236. However, those having ordinary skill in the art will appreciate that the wedge 230 is not limited to having the aperture 237 formed therethrough in proximity to the end surface 236. Those having ordinary skill in the art will appreciate that a handle may be formed by forming an aperture through any portion of the body 233. Further, those having ordinary skill in the art will appreciate that the wedge 230 may be limited to having a handle in order for the wedge 230 to function properly. In other words, those having ordinary skill in the art will appreciate the wedge 230 may not be limited to having a handle in order to secure a screen (not shown) within a basket (not shown) of a vibratory separator (not shown). The magnetic insert 240 may be cylindrical, cubed, pyramidal, or any other shape and may correspond to a similarly shaped aperture 238, which may be configured to receive the magnetic insert 240.

In one or more embodiments, a portion of the body 233 of the wedge 230 may be magnetic. For example, as shown in FIGS. 2A and 2B, the magnetic insert 240 may be configured to be disposed within the body 233 of the wedge 230 and may be considered to form a portion of the body 233 of the wedge 230. For example, as shown in FIG. 2A, the body 233 of the wedge 230 may have an aperture 238 formed therethrough, in which the magnetic insert 240 is configured to be received within the aperture 238. As such, in one or more embodiments, the magnetic insert 240 may be coupled to a portion of the body 233 of the wedge 230, e.g., the magnetic insert 240 may be disposed within the aperture 238 formed through the body 233 of the wedge, and may form a portion of the body 233 of the wedge 230.

In one or more embodiments, the magnetic insert 240 may be formed from a magnetic material. In one or more embodiments, the magnetic material of the magnetic insert 240 may be a permanent magnet. For example, in one or more embodiments, the magnetic insert 240 may be formed from a magnetic material having a pull force between five pounds and 25 pounds. However, those having ordinary skill in the art will appreciate that the magnetic insert 240 may be formed from a magnetic material having a pull force less than five pounds and more than 25 pounds. For example, in one or more embodiments, the magnetic insert 240 may be formed from a magnetic material having a pull force of one pound, two pounds, three pounds, four pounds, thirty pounds, forty pounds, fifty pounds, one hundred pounds or more and any pull force in between. In one or more embodiments, the pull force of the magnetic insert 240 or the magnetic material may be such that magnetic engagement between the wedge 230 and a structure of a vibratory separator (not shown) may be achieved even considering embodiments in which the magnetic insert 240 may be embedded within the body 233 of the wedge 230.

Further, in one or more embodiments, the magnetic insert 240 may be formed from a high-temperature magnet. In other words, the magnetic insert 240 may be formed from a magnetic material that may be able to substantially retain its pull force in high-temperature environments, such as when exposed to high-temperature fluids. In one or more embodiments, the magnetic insert 240 may be formed from, or may include, a ceramic magnet and/or a rare earth magnet. Those having ordinary skill in the art will appreciate that the magnetic insert 240 may be formed from, or may include any magnetic material and is not limited to ceramic magnets and/or rare earth magnets.

As shown in FIG. 2A, the magnetic insert 240 includes a protrusion 241 formed thereon. As shown, the protrusion 241 may be formed around a circumference or an outer surface of the magnetic insert 240. In one or more embodiments, the body 233 of the wedge 230 may be cast or formed around the magnetic insert 240 or with the magnetic insert, and the protrusion 241 may engage with a portion of the body 233 of the wedge 230 and may prevent the magnetic insert 240 from separating from the body 233 of the wedge 230.

Although the magnetic insert 240 is shown having the single protrusion 241 formed around the circumference of the magnetic insert 240, those having ordinary skill in the art will appreciate that two or more protrusions may be formed on the magnetic insert 240, in which each of the protrusions may be configured to help secure the magnetic insert 240 within the body 233 of the wedge 230 and prevent the magnetic insert 240 from separating from the body 233 of the wedge 230. However, those having ordinary skill in the art will appreciate that embodiments disclosed herein are not limited to the magnetic insert 240 having the protrusion 241 formed thereon. For example, in one or more embodiments, the magnetic insert 240 may not necessarily have a protrusion formed thereon, and the magnetic insert 240 may be secured within the aperture 238 through the use of an adhesive or other bonding agent, such as a high-temperature adhesive or other high-temperature bonding agent.

As shown in FIG. 2B, the magnetic insert 240 is coupled to a portion of the body 233 of the wedge 230. As discussed above, the magnetic insert 240 may be coupled to a portion of the body 233 of the wedge 230 by way of a mechanical lock or fastener, e.g., one or more protrusions, e.g., the protrusion 241 of FIG. 2A, formed on the magnetic insert 240 and the body 233 of the wedge being cast or formed around the magnetic insert 240. Further, as discussed above, the magnetic insert 240 may be coupled to a portion of the body 233 of the wedge 230 through the use of an adhesive or other bonding agent.

Furthermore, in one or more embodiments, the magnetic insert 240 may be threadingly engaged with a portion of the body 233 of the wedge 230. For example, referring back to FIG. 2A, in one or more embodiments, an outer surface of the magnetic insert 240 may have male threads (not shown) formed thereon, and an inner surface of the aperture 238 may have corresponding female threads (not shown) formed therein. As such, in one or more embodiments, the male threads of the magnetic insert 240 may engage with the female threads of the aperture 238 such that the magnetic insert 240 is threadingly engaged with a portion of the body 233 of the wedge through the aperture 238. Those having ordinary skill in the art will appreciate that, alternatively, in one or more embodiments, the outer surface of the magnetic insert 240 may have female threads (not shown) formed thereon, and the inner surface of the aperture 238 may have corresponding male threads (not shown) formed therein, such that the magnetic insert 240 may threadingly engage with a portion of the body 233 of the wedge 230 through the aperture 238.

Further, in one or more embodiments, more than one magnetic insert 240 may be used. As such, in one or more embodiments, more than one portion of the body 233 of the wedge 230 may be magnetic. Thus, in one or more embodiments, more than one aperture 238 may be formed through the body 233 of the wedge 230, such that each aperture may correspond to a magnetic insert. Those having ordinary skill in the art will appreciate that embodiments disclosed herein having a plurality of magnetic inserts are not limited to having identical magnetic inserts in terms of size, shape, pull force, and/or material. For example, in one or more embodiments, a plurality of magnetic inserts may be coupled to different portions of the body 233 of the wedge 230, in which each of the plurality of magnetic inserts differed in size, shape, pull force, and material, but each of the plurality of magnetic inserts are still magnetically attracted to a ferromagnetic material of at least a portion of a structure of a vibratory separator (not shown).

Furthermore, although the magnetic insert 240 is shown coupled to a central portion of the body 233 of the wedge 230, those having ordinary skill in the art will appreciate that the magnetic insert 240 may be coupled to any portion of the body 233 of the wedge 230. For example, in one or more embodiments, the aperture 238 configured to receive the magnetic insert 240 may be formed on any portion of the body 233 of the wedge 230, and the magnetic insert 240 may be disposed within the aperture 238 and secured within a portion of the body 233 of the wedge 230.

According to another aspect of the disclosure, there is provided a method of manufacturing a wedging apparatus, the method including forming a body configured to secure a screen to the vibratory separator, the body including a bottom surface, a top surface opposite the bottom surface, and an end surface joining the bottom surface and the top surface, in which each of the bottom surface and the top surface are configured to be a wedging surface, and in which a portion of the body may be magnetic.

In one or more embodiments, the magnetic portion may include a magnetic material disposed in or on the body, such as a magnetic material powder or a magnetic plating covering a portion of an outer surface of the body of the wedge. For example, in one or more embodiments, forming the body may include dispersing a magnetic material powder in a material of the body. Further, in one or more embodiments, forming the body includes plating at least a portion of an outer surface of the body with a magnetic material. In one or more embodiments, the body may also include a magnetic insert coupled to a portion of the body. The method may also include casting or molding the body of the wedge around the magnetic insert, in which the magnetic insert may include a protrusion formed thereon, in which the protrusion may be configured to engage with a portion of the body. In one or more embodiments, during or after the casting or molding process, the body of the wedge may cool or harden around the magnetic insert and the protrusion formed on the magnetic insert, and the protrusion may secure the magnetic insert within the body of the wedge. In one or more embodiments, the body of the wedge may be cast or molded around the magnetic insert such that the magnetic insert is embedded within the body of the wedge such that an outer surface of the magnetic insert is not exposed by the body of the wedge. As discussed above, in one or more embodiments, more than one magnetic inserts may be coupled to or embedded within the body of the wedge. In one or more embodiments, the method may include forming the magnetic insert, in which forming the magnetic insert includes forming a protrusion on an outer surface of the magnetic insert. Those having ordinary skill in the art will appreciate that forming a protrusion on an outer surface of the magnetic insert may be achieved by way of cutting, molding, or any other method known in the art.

Alternatively, the method may include forming an aperture, e.g., the aperture 238 of FIG. 2A, through a portion of an existing wedge and modifying the wedge to receive a magnetic material, e.g., the magnetic insert 241 of FIGS. 2A and 2B. As discussed above, the aperture may be formed to receive the magnetic material. For example, in one or more embodiments, the method may include forming male threads on an outer surface of the magnetic material and corresponding female threads on an inner surface of the aperture, or vice versa, and threadingly engaging the magnetic material within the body of the wedge through the aperture. Further, the method may also include securing the magnetic material within the aperture with an adhesive or other bonding agent, such as a high-temperature adhesive or a high-temperature bonding agent.

As discussed above, in one or more embodiments, the body of the wedge may be formed substantially from a urethane or any other material such as polyurethane. In one or more embodiments, a ferromagnetic material, such as steel, may be coupled to or disposed within the polyurethane wedge. As such, in one or more embodiments, magnetic materials may be coupled to the structure of a vibratory separator such that the magnetic force between the magnetic materials coupled to the structure of the vibratory separator may have enough pull force to magnetically engage with each of the wedges through a polyurethane layer. In other words, wedges that may be formed from a non-magnetic material, such as polyurethane, that have a ferromagnetic material disposed therein may still be magnetically engaged with the structure of the vibratory separator if sufficient magnetic materials, e.g., magnetic materials with sufficient pull force to engage with the wedges through the polyurethane layer, are coupled to the structure of the vibratory separator.

Alternatively, in one or more embodiments, a magnetic additive, such as a magnetic powder, may be incorporated into the polyurethane or other wedge material during a casting or molding process such that the magnetic additive is distributed throughout the wedge. This may remove the need to couple a magnetic material, e.g., the magnetic insert 241 of FIGS. 2A and 2B, to a portion of the body of the wedge, as the magnetic additive may be distributed throughout the body of the wedge and may result in a magnetic wedge without the use of a coupled insert.

According to another aspect of the disclosure, there is provided a method including providing a vibratory separator formed from a ferromagnetic material, and magnetically securing a wedge to the vibratory separator. In one or more embodiments, the vibratory separator may include a basket and a skid coupled to the basket, the basket having a side wall extending along a length of the basket, in which a portion of the vibratory separator is formed from a ferromagnetic material. Further, in one or more embodiments, the wedge may have a magnetic insert of magnetic material magnetically attracted to the ferromagnetic material.

In one or more embodiments, magnetically securing the wedge to the vibratory separator may include magnetically securing the wedge to a basket of the vibratory separator, the basket having a mesh screen secured thereto. Further, in one or more embodiments, magnetically securing the wedge to the vibratory separator may include magnetically securing the wedge to a side wall of the basket of the vibratory separator, wherein the side wall extends along a length of the basket.

The method may also include securing the wedge against a wedge angle and a screen, the wedge angle coupled to a side wall of the basket extending along a length of the basket, wherein the screen is secured against the basket, and further wherein a magnetic attraction between the wedge and the vibratory separator aids in securing the screen to the vibratory separator. In one or more embodiments, a portion of at least one of the basket, the skid, and the side wall is formed from the ferromagnetic material.

For example, referring back to FIG. 1, a portion of the wedge 30 may be formed from a magnetic material, and a portion of at least one of the basket 14, the skid 11, and the side walls 24 of the vibratory separator 10 may be formed from a ferromagnetic material. As such, the wedge 30 may be magnetically attracted to the ferromagnetic material of the vibratory separator and may be secured to various different portions of the vibratory separator 10. For example, the wedge 30 may be magnetically secured to any one of the basket 14, the skid 11, and the side walls 24 of the vibratory separator 10. In one or more embodiments, other portions of the vibratory separator 10 may be formed from a ferromagnetic material, and the wedge 30 may be secured to any portion of the vibratory separator 10.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

What is claimed is:
1. A method comprising:
providing a vibratory separator including a basket, the basket having a sidewall formed from a ferromagnetic material;
coupling a wedge angle to the side wall of the basket by welding the wedge angle to an inside surface of the sidewall of the basket such that the wedge angle, in its entirety, is located inside the basket;
providing a screen on a bottom of the basket, wherein the screen is located below the wedge angle;
providing a wedge having a side surface in contact with the inside surface of the sidewall of the basket, the wedge having a top surface in contact with a bottom surface of the wedge angle, the wedge angle having a bottom surface in contact with an upper surface of the screen, wherein at least a portion of the side surface of the wedge is magnetic so as to provide a magnetic portion of the side surface of the wedge;
mechanically securing the screen within the basket by driving the wedge between the bottom surface of the wedge angle and the top surface of the screen; and magnetically securing the side surface of the wedge to the inside surface of the sidewall of the basket, formed from the ferromagnetic material, with the magnetic portion of the side surface of the wedge.

2. The method of claim 1, wherein the magnetic portion of the side surface of the wedge is provided by a magnetic insert of magnetic material magnetically attracted to the ferromagnetic material.

3. A method comprising:
providing a vibratory separator including a basket, the basket having a sidewall formed from a ferromagnetic material;
coupling a wedge angle to the side wall of the basket by welding the wedge angle to an inside surface of the sidewall of the basket such that the wedge angle, in its entirety, is located inside the basket;
providing a screen on a bottom of the basket, wherein the screen is located below the wedge angle;

providing a wedge having a side surface in contact with the inside surface of the sidewall of the basket, the wedge having a top surface in contact with a bottom surface of the wedge angle, the wedge angle having a bottom surface in contact with an upper surface of the screen, wherein a side surface of a magnetic insert is provided along the side surface of the wedge;

mechanically securing the screen within the basket by driving the wedge between the bottom surface of the wedge angle and the top surface of the screen; and magnetically securing the side surface of the wedge to the inside surface of the sidewall of the basket, formed from the ferromagnetic material, with the side surface of the magnetic insert that is provided along the side surface of the wedge.

\* \* \* \* \*